(12) United States Patent
Vialén et al.

(10) Patent No.: US 6,606,310 B1
(45) Date of Patent: Aug. 12, 2003

(54) MOBILITY AND CALL CONTROL IN AN ATM ENVIRONMENT

(75) Inventors: Jukka Vialén, Espoo (FI); Sanna Mäenpää, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/355,159

(22) PCT Filed: Feb. 11, 1998

(86) PCT No.: PCT/FI98/00125
§ 371 (c)(1),
(2), (4) Date: Aug. 31, 1999

(87) PCT Pub. No.: WO98/36612
PCT Pub. Date: Aug. 20, 1998

(30) Foreign Application Priority Data

Feb. 12, 1997 (FI) .................................................. 970602

(51) Int. Cl.7 ............................. H04Q 7/20; H04Q 7/22
(52) U.S. Cl. ....................... 370/338; 370/395; 370/396; 370/397; 370/398; 370/399; 370/390; 455/426; 455/422; 455/445
(58) Field of Search ................................ 370/338, 395, 370/396, 397, 398, 399, 352, 353, 354, 355, 389, 328, 390; 455/426, 422, 445, 517, 403

(56) References Cited

U.S. PATENT DOCUMENTS

| | | | |
|---|---|---|---|
| 5,313,579 A | | 5/1994 | Chao |
| 5,519,689 A | | 5/1996 | Kim |
| 5,659,544 A | * | 8/1997 | La porta et al. ............. 370/312 |
| 5,936,967 A | * | 8/1999 | Baldwin et al. ............. 370/399 |
| 6,304,549 B1 | * | 10/2001 | Srinivasan et al. ......... 370/398 |

FOREIGN PATENT DOCUMENTS

| | | |
|---|---|---|
| EP | 0 534 716 | 3/1993 |
| EP | 0 600 683 | 6/1994 |
| EP | 0 679 042 | 10/1995 |
| EP | 0 796 022 | 9/1997 |
| GB | 2 268 359 | 1/1994 |
| GB | 2 268 360 | 1/1994 |
| GB | WO 96/37081 | * 11/1996 |
| WO | WO 95/27384 | 10/1995 |
| WO | WO 96/31080 | 10/1996 |
| WO | WO 97/28664 | 8/1997 |

OTHER PUBLICATIONS

International Search Report for PCT/FI98/00125.

* cited by examiner

Primary Examiner—William Trost
Assistant Examiner—Keith Ferguson
(74) Attorney, Agent, or Firm—Squire, Sanders & Dempsey LLP

(57) ABSTRACT

The invention relates to ATM systems, and particularly to mobility and call control management therein. A wireless ATM network comprises at least on ATM switch, and base stations connected to the ATM switch by a user-network-interface interface. In addition, at least one controlling network element of a conventional PLMN network, such as a mobile telephone exchange or a base station controller, which is responsible for the mobility management and call control, is connected to the ATM network by the UNI interface. A permanent virtual channel is provided between the base station and the controlling PLM element for PLM-specific signalling (signalling related to, for example, call control, mobility management or radio resource management). The ATM switch therebetween forwards the signalling without interpreting it in any way. The PLMN element remotely controls the ATM switch to switch a virtual connection between the base station and another point according to the ATM standards.

23 Claims, 5 Drawing Sheets

MOBILITY AND CALL CONTROL IN AN ATM ENVIRONMENT

FIELD OF THE INVENTION

The invention relates to ATM (Asynchronous Transfer Mode) systems and particularly to mobility and call control management therein.

BACKGROUND OF THE INVENTION

Current telecommunication comprises two trends of particular interest: mobile communication and broadband networks. The term broadband typically refers to a bit rate higher than 2 Mbit/s. The term narrowband usually refers to a bit rate of 64 kbit/s or lower. The term wideband occasionally refers to bit rates from 64 kbit/s to 2 Mbit/s. There are at least two (compatible) reasons for the interest in the broadband networks:

1) One broadband bearer shared among several users, few or none of whom need the whole bandwidth alone, can offer advantages concerning the establishment and flexibility of transmission systems.

2) Information to be transmitted over separate transmission channels may demand broadband channels. Users need new high-quality services which, in turn, call for high bit rates. Such services include for example video conferencing, high-speed data transmission etc. A common denominator for these services is multimedia where image, voice and data are integrated into one service.

Owing to its many strengths, ATM (Asynchronous Transfer Mode) is chosen as the data transmission technique in several protocol structures standardized for a B-ISDN (Broadband Integrated Services Digital Network). In this context, the term transmission refers to the use of ATM switching and multiplexing techniques at a data link layer (i.e. an OSI Layer 2, hereinafter referred to as an ATM layer) for transporting end-user traffic from a source to a destination within the network. Virtual connections are set up between the source and the destination, which requires that the network must be provided with switching operations. Signalling and user information are normally transported on different virtual connections at the ATM layer. A virtual connection is identified at the ATM layer by means of a virtual path identifier (VPI) and virtual channel identifier (VCI).

Figure 2:
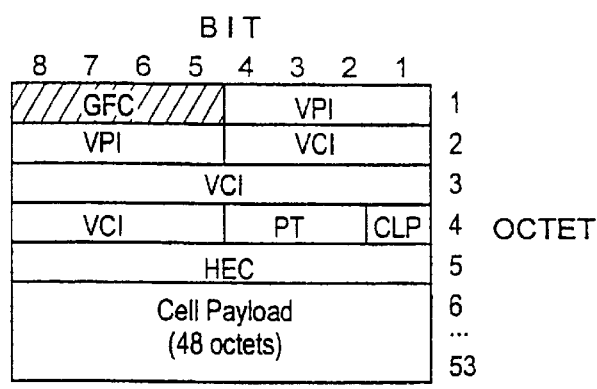

In ATM, information is transported split in fixed-length cells, whereby the number of the cells in a time unit is proportional to the user's bandwidth requirements. Each 53-octet cell is divided into a 5-octet header and a 48-octet information field as shown in FIG. 2.

The primary purpose of the header is to identify a connection number for a cell sequence that sets up a virtual channel for a particular call. Several virtual paths that are multiplexed in the ATM layer can be connected to the same physical layer (i.e. an OSI Layer 1), whereby each path is identified by an 8-bit VPI at a user-network-interface (UNI) and by a 12-bit VPI at a network node interface. Each path can comprise several virtual channels, each of which is identified by a 16-bit VCI. The header can also comprise other fields, such as a header error control (HEC), a generic flow control (GFC), a cell loss priority (CLP) and a payload type (PT).

The user-network-interfaces UNI between an ATM terminal and an ATM switch (a private UNI) and between private and public ATM networks (a public UNI) together with an associated UNI signalling (and an ATM cell) are specified at least in the following specifications:

[1] ATM User-Network-Interface Specification, version 3.1, ATM Forum, 1994

[2] ATM User-Network-Interface (UNI) Signalling Specification, version 4.0, ATM Forum, July 1996

[3] ITU-T Recommendation Q.2931 (1994) Broadband Integrated services Digital Network (B-ISDN), Digital Signalling System No. 2 (DSS 2), User-Network-Interface (UNI) Layer 3 specification for Basic Call/Connection Control. ITU-T.

In mobile networks (PLMN), radio interfaces have conventionally been narrowband interfaces. Transmission systems in the mobile networks have conventionally been implemented by circuit switched connections in a star or tree network configuration. In order to increase the capacity and flexibility of transmission systems, different broadband packet switched transmission systems, such as WO 9400959 and EP 0366342 have also been proposed for mobile networks. EP0426269 introduces a mobile system wherein base stations are connected to ATM network switches by routers. Virtual connections controlled by the base stations are set up between the base stations through the ATM network. Elementary mobility management is based on routing tables maintained in the base stations and in the ATM switches and updated as the subscribers move in the network.

Another potential future trend is that mobile systems have a broadband radio interface. The transmission system of the mobile system should in that case also be a broadband transmission system, a potential alternative thereof being the ATM technique.

A third trend is to introduce wireless data transmission (wireless ATM) and mobility into ATM networks (wireless ATM). However, the problem with this trend is that current B-ISDN and ATM standards in no way support the mobility management, subscriber authentication, call control, etc., required by wireless communication. Introducing these additional features required by wireless communication into the ATM network calls for considerable development and standardization work to be carried out and significant modifications to be made to the existing ATM systems. Implementing wireless ATM is therefore a slow and an expensive process. Such a process conducted by wireless ATM work groups is about to start in the ATM Forum.

BRIEF DESCRIPTION OF THE INVENTION

An object of the invention is to enable the introduction of wireless data transmission and mobility into an ATM network without significant modifications to the existing ATM networks and standards.

The invention relates to a wireless ATM network comprising mobile stations, base stations and at least one ATM switch, the base stations being connected to the ATM switch by a user-network-interface (UNI). The invention is characterized in that at least one controlling PLMN network element is connected to said ATM switch by the UNI interface to carry out call control and mobility management, a first permanent ATM virtual channel is provided between said PLMN network element and each base station for transferring call control and mobility management signalling transparently therebetween through the ATM network, said PLMN network element is arranged to remotely control said ATM switch to switch ATM virtual channels dynamically between the base stations and another point in the ATM network.

The invention also relates to a cellular radio network as claimed in claim 2 comprising mobile stations, base stations, at least one controlling PLMN network element that is responsible for call control and mobility management, and an ATM transmission network comprising at least one ATM switch, the base stations and said controlling PLMN network element being connected to the ATM switch by a user-network-interface (UNI).

The invention also relates to methods for mobility management and call control in a wireless ATM network and in a cellular radio network as claimed in claims 9 and 10.

The invention also relates to an ATM switch element as claimed in claim 12 and to a mobile network element as claimed in claim 18.

According to the invention, wireless base stations are connected to an ATM switch by a UNI interface in an ATM network. At least one controlling network element of a conventional PLMN network, such as a mobile telephone exchange and/or a base station controller is also connected to the ATM network by the UNI interface, the controlling network element being responsible for mobility management and call control. There is a permanent virtual channel (PVC) via said ATM switch between the base station and said at least one controlling cellular network element. Signalling related for example to call control, mobility management and/or radio resource management between a mobile station and the controlling cellular network element is transmitted over the permanent virtual channel. The intermediate ATM switch (ATM switches) forwards the signalling without interpreting it in any way. For the ATM switch, the controlling cellular network element and the base station represent an ATM terminal that can be reached via the UNI interface. Furthermore, there is a permanent virtual channel PVC between said at least one cellular network element and said ATM switch. Said controlling network element uses the second permanent virtual channel for commanding from a remote location the ATM switch to switch a virtual connection between the base station and another point according to the ATM standards. According to the invention, all special network elements and special functions related to wireless communication can be implemented by using the network elements and solutions previously designed for the PLMN networks. Designing special solutions for the wireless ATM is thus avoided. These cellular network elements are connected to the ATM network via a standard UNI interface, but the signalling between the cellular network elements takes place transparently through the ATM network via said permanent virtual connections. Thus, the signalling related to wireless communication does not cause modifications to a standard ATM UNI protocol. The only addition required to the ATM switch is functionality by means of which the controlling cellular network element can manipulate the ATM switch operation via the second permanent virtual connection to switch or release the desired virtual connection.

In a preferred embodiment of the invention, an ILMI (Interim Local Management Interface) is used as the signalling interface between the ATM switch and the controlling cellular network element via the permanent virtual connection of the invention. In the preferred embodiment of the invention, remote controlling the ATM switch from the cellular network element is carried out by using an SNMP (Simple Network Management Protocol). The SNMP protocol already includes features which can be applied to control the switching in the wireless ATM network of the invention. The controlling cellular network element then acts as an SNMP manager, and an ATM node contains an SNMP agent. Remote commands are carried in SNMP protocol data units (PDU).

Alternatively, remote controlling according to the invention may be implemented by using UNI signalling without a permanent logical channel between the PLMN network element and the ATM switch. This, however, requires the current UNI signal to be modified in order to enable the switching to be remotely controlled.

Figure 1:
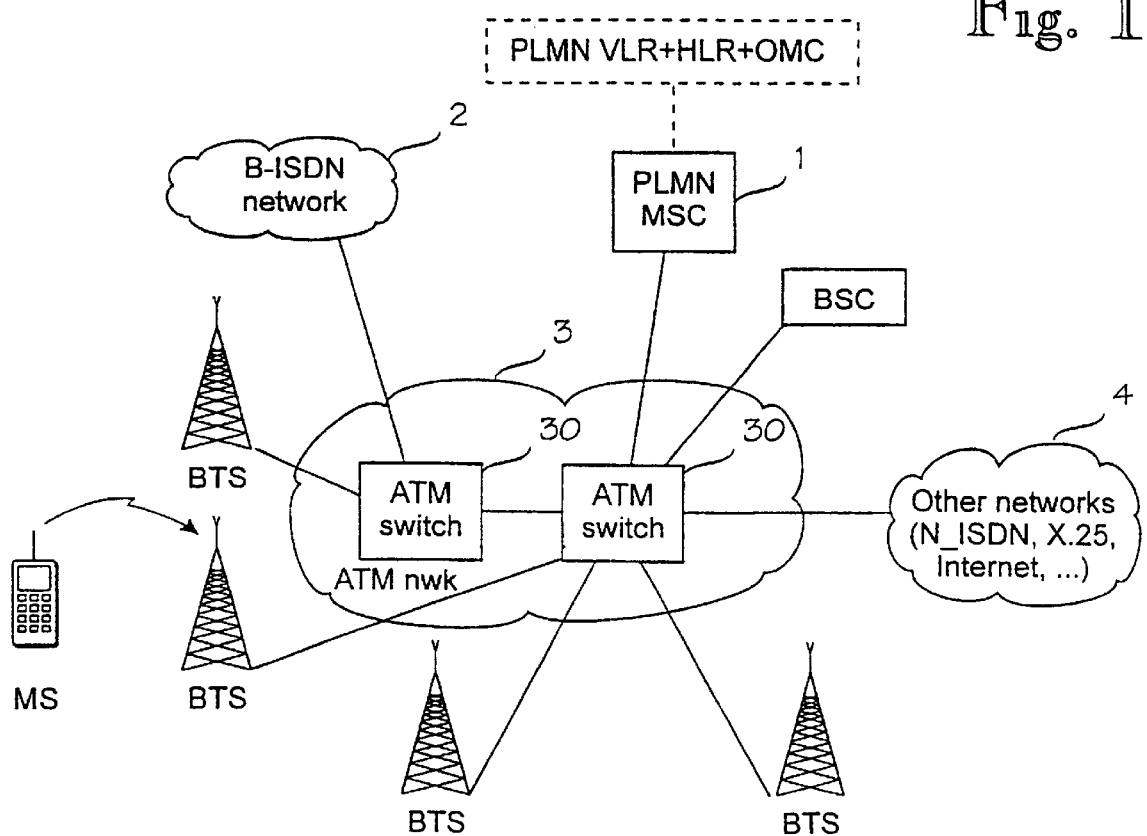
Figure 3:
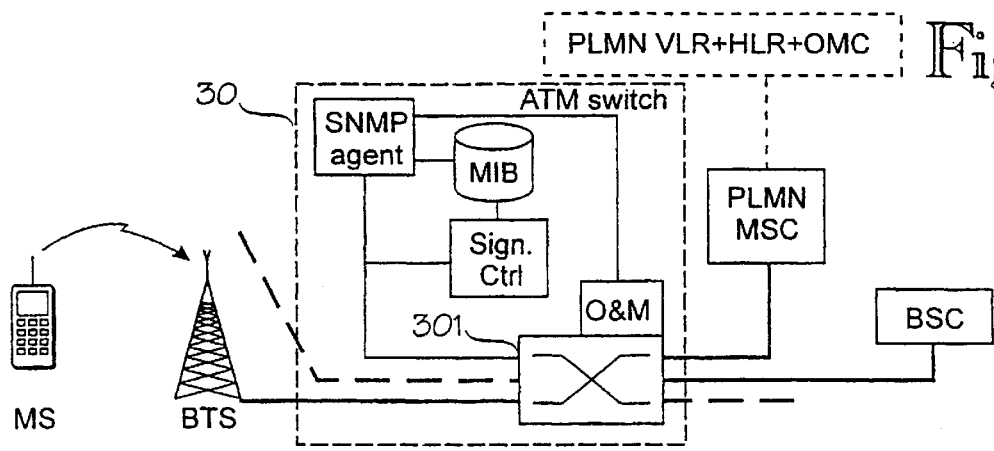
Figure 4:
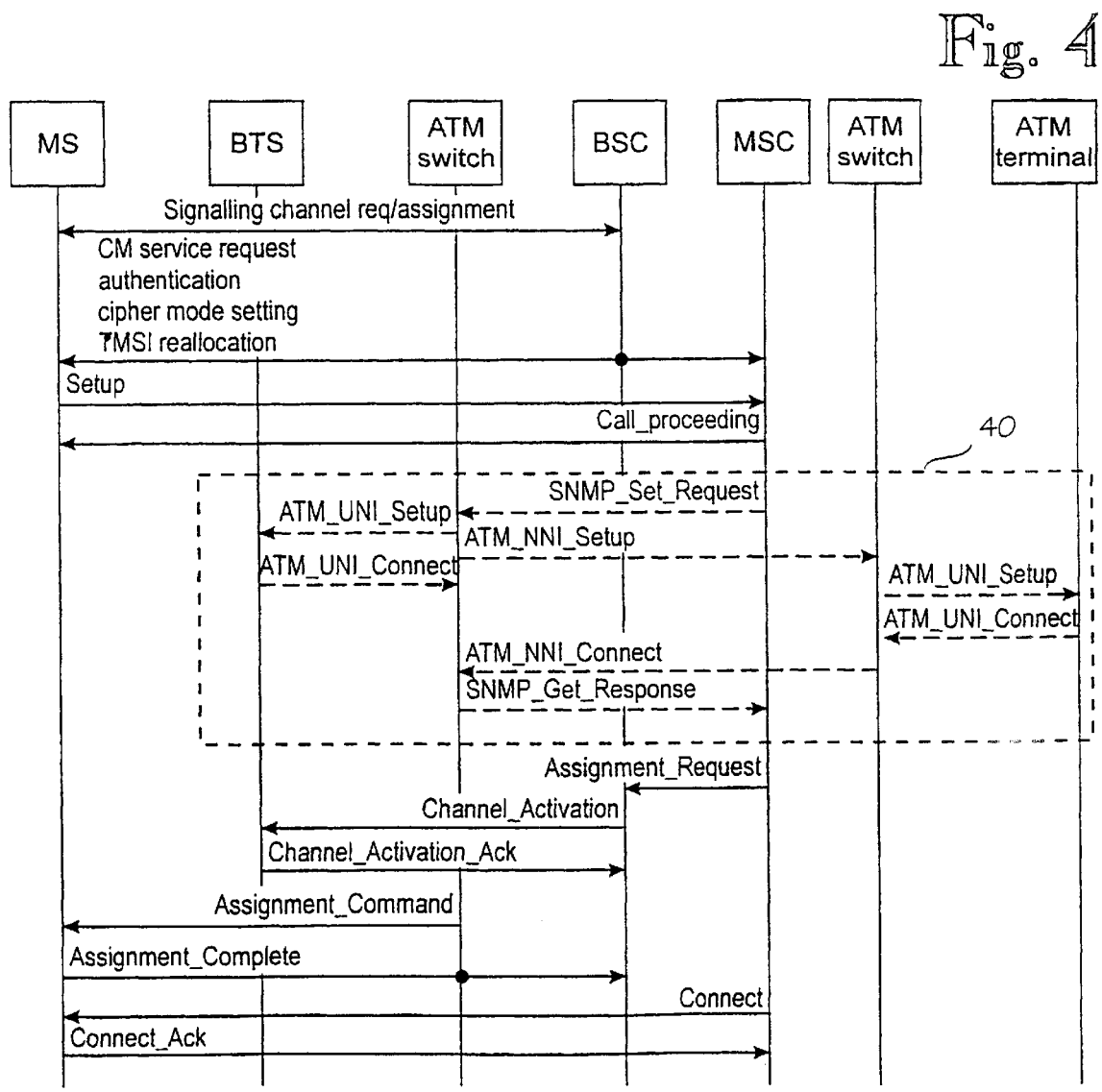
Figure 5:
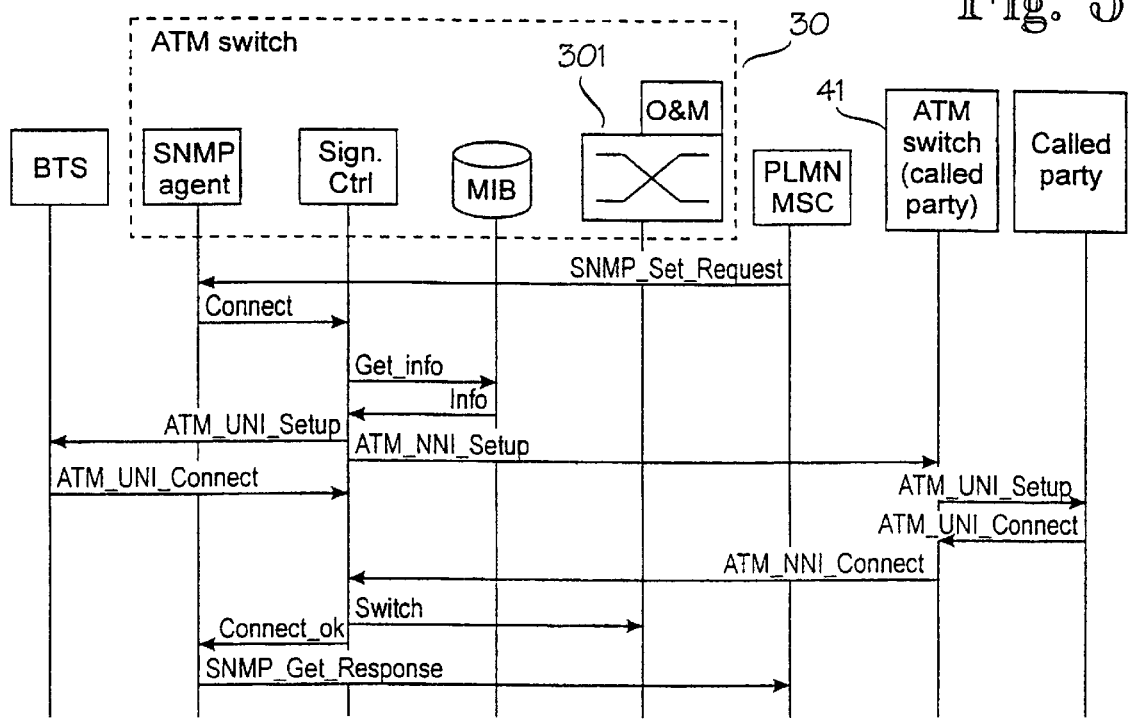
Figure 6:
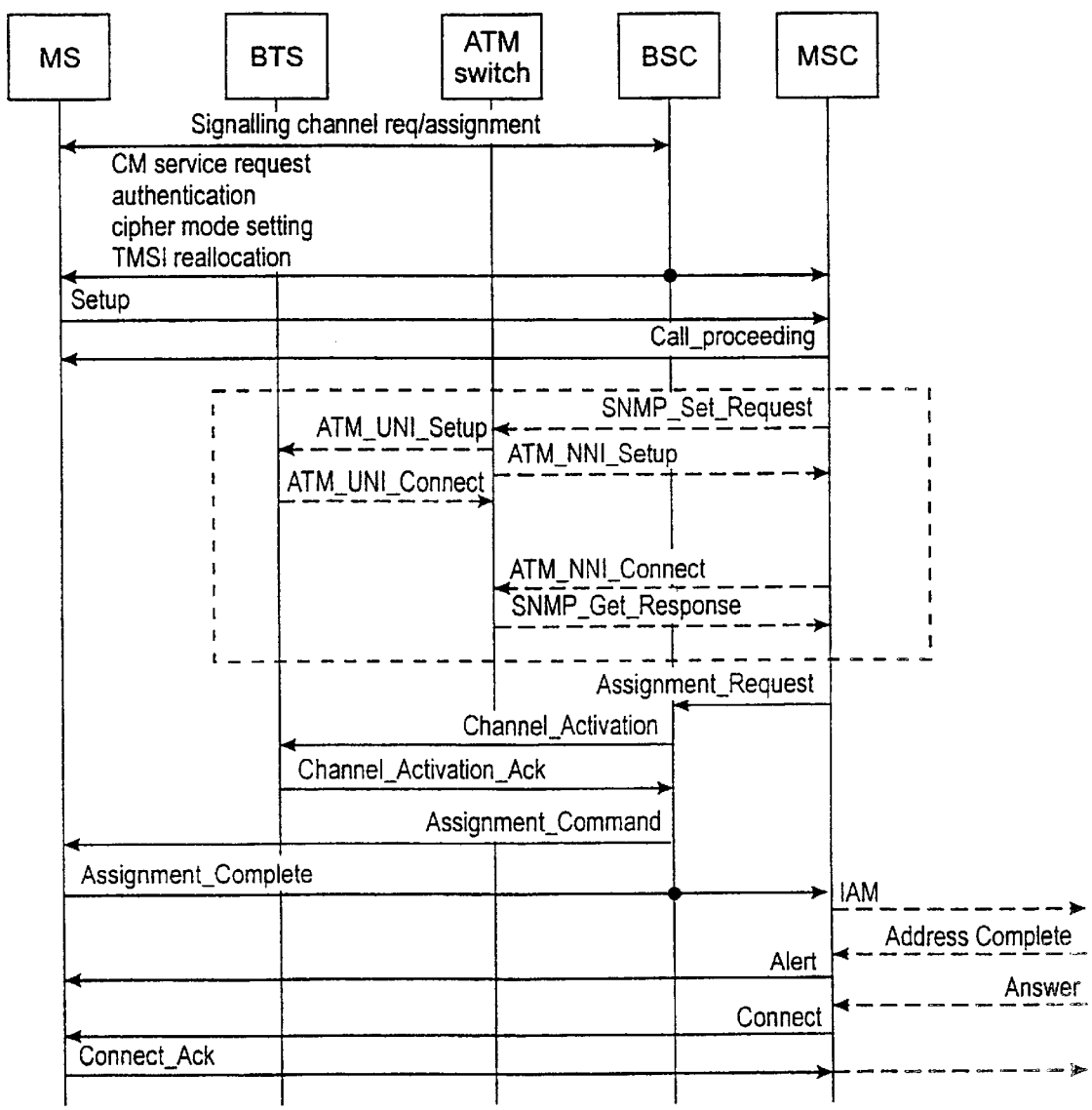
Figure 7:
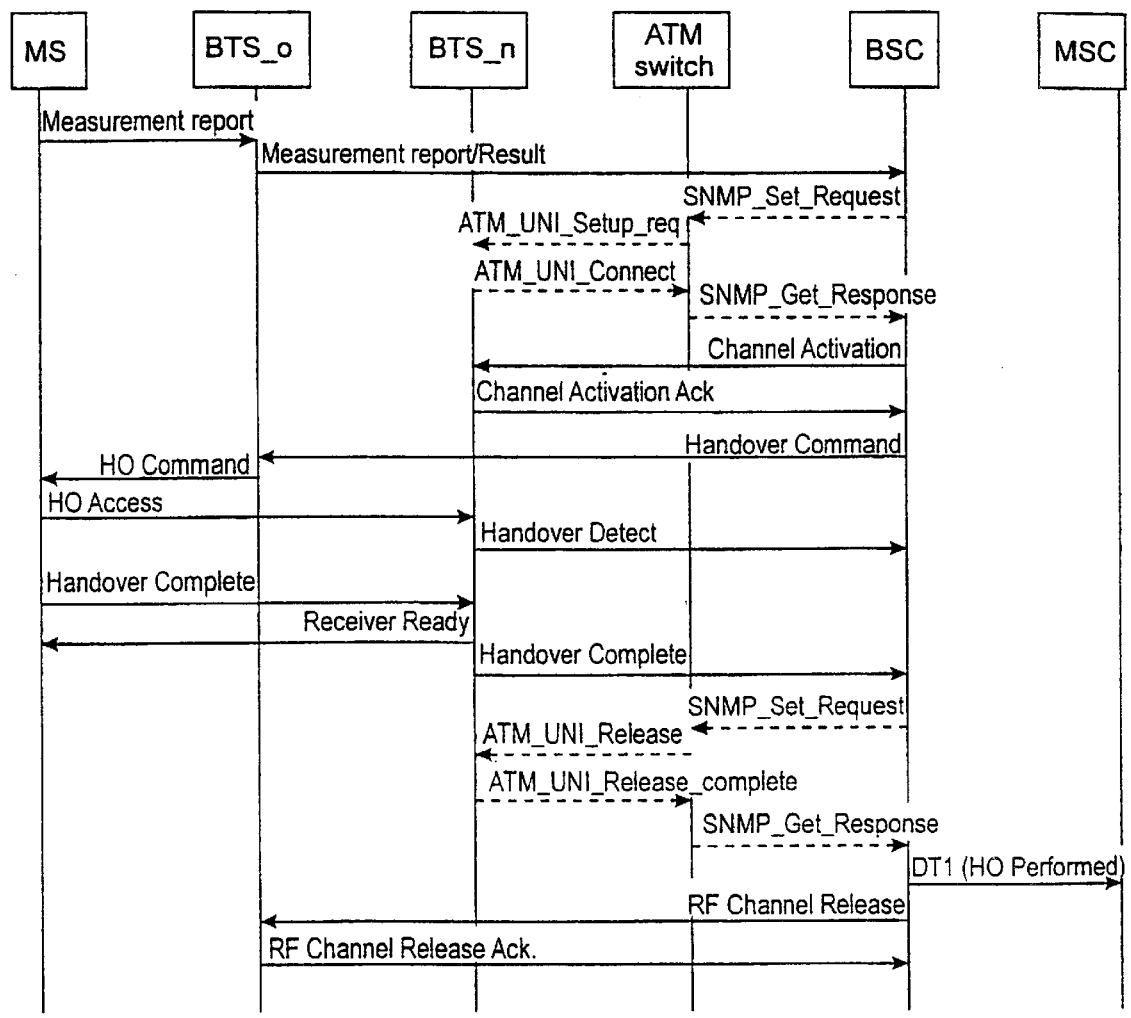

In the following, the invention is described in more detail with reference to the accompanying drawings, in which FIG. 1 shows a basic architecture for a telecommunication system to which the present invention can be applied, FIG. 2 shows the structure of an ATM cell, FIG. 3 shows the functional architecture of the ATM switch of the invention in a telecommunication system presented in FIG. 1, FIG. 4 is a signalling diagram illustrating the data call set-up of the invention, FIG. 5 is a signalling diagram illustrating internal signalling of an ATM switch during the call set-up presented in FIG. 4, FIG. 6 is a signalling diagram illustrating the speech call set-up of the invention, FIG. 7 is a signalling diagram illustrating the handover of the invention between two base stations connected to the same ATM switch.

DETAILED DESCRIPTION OF THE INVENTION

The present invention can be applied to any broadband network using an ATM technique, for introducing wireless communication and mobility management into the networks. Correspondingly, the invention can be applied to any mobile network for implementing a transmission system between the network elements by means of an ATM network. The final network architecture, signalling and call set-up of the invention is very much alike in both cases.

A mobile system used as a whole, or the network elements thereof being used, for the implementation of a wireless ATM, can be any cellular radio system or some other radio system. In this patent application, a mobile system or a PLMN is taken to mean all the radio systems supporting mobility management.

Different cellular systems may differ from one another as concerns the number and the functions of different types of network elements. Cellular systems may comprise for example only mobile telephone exchanges and base stations or, in addition, also base station controllers. Signalling may also differ greatly between different cellular systems. Such differences are, however, irrelevant to the invention, as system-specific signalling is performed transparently through the ATM network via permanent virtual connections set up between the network elements in accordance with the invention. The control of the ATM switching according to the invention takes place via the permanent virtual connection at the same call set-up stage and by the same network element as specified in the system concerned.

The type of radio interface between the base stations and the mobile stations is also irrelevant to the invention. The radio interface may be a narrowband or a broadband interface, TDMA or CDMA, a satellite, an interface according to a current standard (for example the GSM) or an interface according to a future standard (for example the UMTS).

The European digital cellular mobile communication system GSM (Global System for Mobile Communication) is used as an example in the following description of the preferred embodiments of the invention. The basic components of the GSM system are specified in the GSM specifications. As concerns the most significant description of the GSM system, reference is made to the GSM specifications and "GSM System for Mobile Communications", M. Mouly and M. Pautet, Palaiseau, France, 1992, ISBN:2-9507 190-07-7.

FIG. 1 shows a telecommunication system comprising mobile stations MS, base stations BTS, a base station controller BSC, a mobile telephone exchange MSC and an ATM network 3 including one or more ATM switches 30. A mobile network PLMN also comprises other network elements, such as subscriber data bases HLR (a home location register) and VLR (a visitor location register) and an operation and maintenance centre (OMC). The home location register HLR permanently contains subscriber information and information indicating the visitor location register VLR in the area of which the mobile station is located at a particular time. The subscriber information regarding subscribers visiting the VLR area is temporarily copied to the visitor location register VLR;

According to the invention, all mobile network operations, such as call control, mobility management and radio resource management are implemented in the PLMN network elements BTS, BSC and MSC. As is usual in the GSM system, the MSC is responsible for call set-up, call switching and call control. A base station system is composed of the base station controller BSC and the base stations BTS. The base station controller BSC is used for controlling several base stations. The BSC can also control a handover between two BTSs connected thereto. An A interface towards the MSC and an Abis interface towards the BTS have been defined for the BSC. These interfaces are specified in the GSM standards. The base stations BTS provide a radio interface through which the mobile stations MS are connected to the BSC and the MSC.

The ATM network 3 provides a transmission system that connects the BTS to the other PLMN network elements. The ATM network 3 may also be connected to other ATM networks 2, such as a B-ISDN, or to other data networks 4, such as an N-ISDN, a PSDN (for example X.25) or the Internet. The ATM network 3 is a network preferably offering standard ATM-UNI interfaces whereto permanent virtual connections in accordance with the invention have been set up for PLMN signalling and wherein at least one ATM switch 30 is provided with functionality enabling the PLMN network element to control the switching of the virtual connections via the ATM switch 30.

FIG. 3 gives a more detailed description of the telecommunication system signalling architecture shown in FIG. 1. For the sake of clarity, only one BTS, one ATM switch 30, one BSC and one MSC are shown in FIG. 3. All the interfaces between the ATM switch 30 and the PLMN network elements BTS, BSC and MSC are user-network-interfaces (UNI) drawn by a thick solid line in FIG. 3. The UNI interface is specified in references [1], [2] and [3]. Thus, for the ATM switch, the PLMN network elements represent conventional ATM devices (users) that can be reached-over the UNI interface. The PLMN network elements are provided with an ATM adapter that creates a UNI interface towards the ATM network 3 and a PLMN interface towards the network element.

When a telecommunication system presented in FIG. 3 is being built, the following permanent virtual connections (PVC) over the UNI interfaces must be set up for the invention:

1) PVC1 between the BTS and the MSC (via the switching field 301 of the ATM switch 30). The PVC1 is used to transmit PLMN signalling messages (for example call control, mobility management, authentication, etc.) between the MSC and the MS in the ATM cell payload field.

2) PVC2 between the BTS and the BSC (via the ATM switch 30). The PVC2 is used to transmit PLMN signalling messages (for example radio resource management) between the BSC and the BTS in the ATM cell payload field.

3) PVC3 between the BSC and the MSC (through the ATM switch 30), the PVC3 also being set up for the PLMN signalling (in the ATM cell payload field).

4) PVC4 between the MSC and the switching control of the ATM switch 30. PVC5 between the BSC and the switching control of the ATM switch 30. The MSC and the BSC use the PVC4 and the PVC5 to remote control the switching operation of the ATM switch 30 in accordance with the invention.

It is important to note that the permanent virtual connections PVC can be set up in many alternative ways without deviating from the inventive idea of the invention. For example, the PVC1 may be replaced by a solution wherein the signalling between the MS and the MSC is performed via the BSC by using the PVC2 and the PVC3, the solution hierarchially resembling a conventional GSM network configuration. On the other hand, if the PLMN network does not comprise any base station controller, the permanent virtual channels PVC2, PVC3 and PVC5 then do not exist.

As will be illustrated below by way of examples, all PLMN signalling via the permanent virtual connections PVC1, PVC2 and PVC3 in a preferred embodiment of the invention is substantially in accordance with the GSM specifications. The intermediate ATM network 3 is transparent as regards the PLMN signalling. All PLMN signalling is transferred in the payload field in the ATM cells that are relayed by the ATM switch 30 without interpreting their contents. Thus, the PLMN signalling messages do not call for any modifications to the ATM UNI signalling protocol.

In a preferred embodiment of the invention, the Interim Local Management Interface (ILMI) specified in references [1] and [2] is used as a remote control interface on the permanent connections PVC4 and PVC5. The ILMI uses an SNMP protocol (Simple Network Management Protocol) for monitoring and controlling management information regarding ATM layer parameters and physical layer parameters over the UNI between the ATM switches and ATM terminals. The SNMP is specified in RFC 1157, A Simple Network Protocol, May 1990. References [1] and [2] also describe the SNMP protocol and messages. The ATM switch includes an agent application supporting the SNMP/ILMI operations. UNI management information is presented in a management information base (MIB) located in the ATM switch. The MIB includes for example the following accessible management information types: a physical layer: an ATM layer; ATM layer statistics; virtual path connections (VPC); virtual channel connections (VCC); and address registration information.

To implement the above described features, the following functional elements are presented in the ATM switch 30 in FIG. 3: an SNMP AGENT, a management information base (MIB), an ATM signalling control SIGN-CTRL, a switching matrix 301 and an operation and management interface O&M towards the switching matrix. The ATM signalling control is responsible for the UNI signalling according to references [1] and [2] and controls the switching operations of the switching matrix 301 via the O&M interface. The MIB is the above mentioned data base maintaining status and configuration information on virtual path and virtual channel connections that are available at the UNI interfaces of the ATM switch.

In accordance with the invention, a controlling PLMN element, such as the MSC or the BSC, manipulates the management information by means of the SNMP protocol operations specified in RFC 1157. In the following, FIGS. 4, 5, 6 and 7 present various examples of the call set-up signalling of the invention. Signalling procedures in the examples are based on the GSM signalling messages.

A signalling diagram presented in FIG. 4 illustrates a data call set-up originating from an MS. GSM signalling comprises for example a signalling channel request and a grant, CM service requests, authentication, cipher mode setting, and temporary mobile station identifier (TMSI) allocation. The MS sends a SETUP message to a BTS, the message being forwarded to an MSC via a PVC1. The MSC intrepets the address of the receiver of the SETUP message to be an ATM address whose switching can be accomplished via an ATM switch whereto the BTS is connected. If the call set-up is accepted, the MSC sends a CALL_PROCEEDING message to the MS via the connection PVC1 and the base station BTS. This message informs the MS that the MSC is handling the call. So far, the description has dealt with normal GSM signalling except that the signalling is transmitted through an ATM network via the permanent virtual connections PVC1, PVC2 and PVC3 of the invention in an ATM cell payload field. Otherwise, this signalling example is irrelevant to the invention and does not need to be described in more detail in this context.

The following example illustrates how the MSC controls an ATM switch 30 to switch a virtual connection (a data connection) between the BTS and a called ATM subscriber before performing the switching of a radio channel. This signalling is presented in block 40 marked off by a dashed line in FIG. 4. Signalling in block 40 is also described in FIG. 5 that also shows messages between the elements within the ATM switch 30.

With reference to FIGS. 4 and 5, the MSC sends an SNMP protocol Set-Request-PDU message to the SNMP agent of the ATM switch 30 via a permanent virtual connection PVC4. In this message, the MSC gives an address addr_1 (the calling party, the BTS) and an address addr_2 (the called party, the "atm terminal" shown in FIG. 4) as parameters, i.e. the address between which a virtual connection should be set up by the ATM switch 30. Both ATM and E.164 addresses may be used.

Next, the SNMP agent uses normal ATM-UNI signalling in order to set-up the connection.

With reference to FIG. 5, the SNMP agent sends a connect command to a signalling control unit. The connect command includes as parameters the address addr_1 and the address addr_2. A signalling control unit SIGN-CTRL then inquires from an MIB data base by a get_info command those (ATM switch) ports whereto the addresses addr_1 and addr_2 are connected. In its info response, the MIB gives the port numbers and VPI/VCI values to be used for the connections. The signalling control SIGN-CTRL then performs a normal ATM connection set-up procedure. First, the SIGN-CTRL sends an ATM_UNI_SETUP message to a BTS and an ATM_NNI_SETUP message to an ATM switch 40 of the calling party. An ATM switch 41 sends an ATM_UNI_SETUP message to a called party (an ATM terminal). The SETUP messages ask different parties to begin with the call set-up. The BTS accepts the call by sending an ATM_UNI_CONNECT message to an ATM switch 30. Correspondingly, the called party accepts the call by sending an ATM_UNI_CONNECT message to the ATM switch 41. Further, the ATM switch 41 accepts the call by sending an ATM_NNI_CONNECT message to the ATM switch 30.

After the successful call set-up described above, the signalling unit SIGN-CTRL commands a switching matrix 301 to actually connect the VPI/VCI of the calling party (BTS) to the VPI/VCI of the called party (the ATM terminal) via an O&M interface (a switch command). The signalling unit SIGN-CTRL sends a connect_ok response to the SNMP agent, the response containing the addresses received in the connect command, the VPI/VCI values being added on these addresses. The SNMP agent then sends an SNMP_GET_RESPONSE message to the MSC via the connection PVC4, the message containing said VPI/VCI values.

Next, the MSC sends an ASSIGNMENT REQUEST message to a BSC, the message containing said VPI/VCI values. These values can be either coded into the optional fields of the ASSIGNMENT REQUEST message according to the standard, or new information elements must be added to the message. The BSC performs the required radio resource reservations for said connection and asks the BTS to activate a radio channel by a CHANNEL_ACTIVATION message. This message must also transmit the VPI/VCI values, i.e. the values must be either coded into the optional fields of the message, or new information elements must be added to the message. The BTS can switch the radio channel for the ATM connection by using the aforementioned information. The signalling then follows normal GSM call set-up signalling except that the MSC sends a CONNECT message to the mobile station immediately after receiving an ASSIGNMENT COMPLETE message. In a normal case, the MSC would wait for a message (ANSWER) coming from subscriber B, but in this case, the connection has already been switched up to subscriber B.

The signalling presented in FIG. 4 then follows the normal GSM call set-up signalling between the BTS and the MSC via the permanent virtual connection PVC1 and between the BTS and the BSC via the permanent virtual connection PVC2. This signalling is also irrelevant to the invention and only serves as an example of potential signalling. Therefore, rest of the messages presented in FIG. 4 are not dealt with in this context but, as concerns the messages, reference is made to the above mentioned publication and the GSM specifications.

FIG. 6 shows the set-up of the invention for a speech call originating from an MS. The GSM signalling in the call set-up substantially corresponds to that in FIG. 4. The essential difference is that a (speech) connection is now switched in a "normal" way via an MSC, and an ATM connection is set up between a BTS and the MSC (in the example in FIG. 4, the ATM connection was directly set up between the BTS and subscriber B without a through connection via the MSC).

The MSC controls an ATM switch 30 to switch a virtual connection for the call between the BTS and the MSC by sending an SNMP_Set_Request message via a permanent virtual connection PVC4, the message containing a calling party address addr_1 (BTS) and a called party address addr_2 (MSC). The signalling between the internal elements of the ATM switch 30 then proceeds as in FIG. 5. A signalling unit SIGN-CTRL then sends ATM_UNI_Setup messages to the BTS and the MSC. The BTS and the MSC respond by an ATM_UNI_Connect message. The signalling unit SIGN-CTRL then commands a switching field 301 to switch a connection between the VPI/VCIs being allocated. The SIGN-CTRL sends a connect_ok response to an SNMP agent, the response containing the addresses addr_1 and addr_2 and the VPI/VCI values added thereto. The SNMP agent sends an SNMP_Get_Response message to the MSC via the connection PVC4, the message containing said VPI/VCI values. ASSIGNMENT REQUEST and CHANNEL ACTIVATION messages then follow the above described example, the GSM signalling thereupon proceeding entirely according to the GSM.

Yet another example describes a handover between two BTSs connected to the same ATM switch. Such a handover may be performed according to the same principles presented in the call set-up example. FIG. 7 shows an example of a handover in the case when a BSC decides upon the moment of performing the handover (as in the GSM system). In FIG. 7, solid lines illustrate GSM messages and dashed lines illustrate non-GSM messages related to the control of the ATM switch of the invention.

As known from before, an MS measures, in addition to a serving base station, downlink signals from a particular group of neighbouring base stations. The MS regularly reports on this measurement data to a BSC that makes a handover decision on the basis of the data. In FIG. 7, an MS sends a measurement report to the currently serving base station BTS_o (hereinafter referred to as an old base station) in a measurement report message. The BTS_o forwards the measurement report to the BSC in ATM cells via a permanent virtual connection PVC2. Let us assume that the BSC decides on the basis of the measurement results sent by the MS (and according to the handover algorithm being used) that the call should be handed over from the old base station BTS_o to a new base station BTS_n.

After making the handover decision, the BSC sends an SNMP_Set_Request message to an ATM switch via a virtual connection PVC4. This message contains a command to switch a traffic channel as a virtual circuit between the new base station BTS_n and the ATM switch. In other words, the message contains an address addr_1 for the new base station. The SNMP agent, the MIB data base and the signalling unit SIGN-CTRL in the ATM switch communicate like in FIG. 4 and the signalling unit obtains information on the ATM switch port whereto the BTS_n is connected and the VPI/VCI value associated with the ATM switch port. The signalling unit SIGN-CTRL then sends an ATM_UNI_Setup message to the new base station BTS_n. The BTS_n accepts the call by sending an ATM_UNI_Connect message. The signalling unit SIGN-CTRL controls a switching field 301 to switch a logical connection between the ATM switch and the BTS to the logical connection of the other party of the call. Then, the SIGN-CTRL gives a connect_ok response to the SNMP agent, the response containing the address addr_1 and the corresponding VPI/VCI value. The SNMP agent sends an SNMP_Get_Response message to the BSC via the virtual connection PVC4, the message containing the address addr_1 and said VPI/VCI value.

After receiving the VPI/VCI values delivered in the SNMP_Get_Response message for the virtual connection that is switched, the BSC then forwards this information in a CHANNEL_ACTIVATION message (via a permanent virtual connection) to the new base station BTS_n that thus receives information on the channels to be switched for each ATM connection (VPI/VCI). This requires that the modifications described in the previous example must be made to the CHANNEL_ACTIVATION message. The BTS_n acknowledges by sending a CHANNEL_ACTIVATION_ACK message. The BSC sends a HANDOVER_COMMAND message to the old base station BTS_o via a permanent virtual connection. This message contains information on the new base station BTS_n. Next, a handover according to the GSM specifications is performed from the old base station to the new base station. As a result of the handover, a radio interface traffic channel reserved for the call in the BTS_n is switched to the logical connection set up between the ATM switch and the new base station BTS_n. The GSM signalling associated with the handover is irrelevant to the invention, and, therefore, is not described in more detail in this context. As regards a more detailed description of the messages presented in FIG. 7, reference is made to the above mentioned publication and the GSM specifications. The signalling between the base stations BTS and the base station controllers BSC naturally takes place through the permanent virtual connections of the invention.

After receiving information from the new base station BTS_n about the accomplishment of the handover on a radio path, the BSC commands the ATM switch to switch a call from the virtual connection of the old base station BTS_o to the virtual connection of the new base station BTS_n. More precisely, the BTS sends an SNMP_Set_Request message to the ATM switch via the connection PVC4. Since the switching from the old virtual connection to the new one is performed only on the calling party side, from the BTS_o at the BTS_n (locally), ATM signalling is not required at this moment. The virtual connection is maintained unchanged towards the other party. Thus, the ATM switch acts as an anchor point of the handover during the handover of the invention. The SNMP_Set_Request message sent by the BSC also contains a command to release the old virtual connection to the old base station BTS_o. This command can also be sent as a separate message. As a result of the command, the signalling unit SIGN-CTRL of the ATM switch sends an ATM_UNI_Release message to the old base station BTS_o. This message indicates that the connection has been released and that the old base station BTS_o should deallocate the virtual channel and prepare to release the connection after sending an ATM_UNI_Release_complete message. The BTS_o sends said ATM_UNI_Release_complete message to the ATM switch. Then, the BTS_o and the ATM switch release the connection. In an SNMP_Get_Response message, the ATM switch informs the BSC of the switching that has been performed and of the old connection that has been released. The BSC informs the MSC of the accomplishment of the handover via a connection PVC3.

Next, normal GSM signalling takes place. The BSC commands the old base station BTS_o to deallocate the radio channel resources by sending a RF_CHANNEL_RELEASE GSM message via a permanent virtual connection PVC2. The BTS_o acknowledges by sending a RF_CHANNEL_RELEASE_ACK message. The handover is now completed.

The accompanying drawings and the description related thereto are only intended to illustrate the present invention. The details of the invention can be modified within the scope and spirit of the appended claims.

What is claimed is:

1. A wireless asynchronous transfer mode (ATM) network including mobile stations, base stations and at least one ATM switch, the base stations being connected to the ATM switch by a user-network-interface (UNI), the network comprising:

at least one controlling mobile network element connected to the ATM switch by the UNI to carry out a call control and mobility management;

a first permanent ATM virtual channel provided between a mobile network element and each base station for transferring call control and mobility management signalling transparently therebetween through the ATM network; and the mobile network element configured to remotely control the ATM switch to switch ATM virtual channels dynamically between the base stations and another point in the ATM network.

2. The network according to claim 1, further comprising:

a second permanent ATM virtual channel provided between the mobile network element and the ATM switch; and the mobile network element configured to remotely control the ATM switch via the second permanent ATM virtual channel.

3. The network according to claim 1, further comprising a remote control protocol between the mobile network element and the ATM switch being a Simple Network Management Protocol.

4. The network according to claim 1, further comprising a remote control between the mobile network element and the ATM switch being based on UNI signalling.

5. The network according to claim 1, wherein the at least one mobile network element comprises at least one of a mobile telephone exchange and a base station controller.

6. A mobile network comprising:

mobile stations;

base stations;

at least one controlling public land mobile network (PLMN) network element responsible for call control and mobility management; and an asynchronous transfer mode (ATM) transmission network including at least one ATM switch, the base stations and a controlling mobile network element connected to the ATM switch by a user-network-interface (UNI); and a first permanent ATM virtual channel provided between the controlling mobile network element and each base station for transferring call control and mobility management signalling transparently therebetween through an ATM transmission network;

the controlling mobile network element configured to remotely control the ATM switch to switch ATM virtual channels dynamically between the base stations and another point in the ATM transmission network.

7. A wireless asynchronous transfer mode (ATM) network comprising:

mobile stations;

base stations;

at least one ATM switch, the base stations connected to the ATM switch by a user-network-interface (UNI), at least one controlling mobile network element connected to the ATM switch by the UNI to carry out a call control and mobility management;

a first permanent ATM virtual channel provided between the mobile network element and each base station for transferring call control and mobility management signalling transparently therebetween through the ATM network;

the mobile network element configured to remotely control the ATM switch to switch the ATM virtual channels dynamically between the base stations and another point in the ATM network, wherein the ATM switch includes means for performing a standard UNI signalling procedure between the ATM switch, the base station and another point in the ATM network in response to the remote control of the mobile network element, wherein the UNI signalling procedure peformed being one of setting up, releasing and reswitching a logical virtual channel for a call.

8. The network according to claim 1, wherein the ATM switch is able to switch a call directly to another party without having to switch the call via the mobile network element.

9. A method for mobility management and call control in a wireless asynchronous transfer mode (ATM) network including mobile stations, base stations and at least one ATM switch, the base stations being connected to the ATM switch by a user-network-interface (UNI), the method comprising:

transferring signalling related to the mobility management and the call control transparently between the base stations and a controlling mobile network element through the ATM network on permanent logical virtual channels;

setting up, in the ATM switch, call-specific logical virtual channels between the base stations and other parties by using UNI signalling; and remotely controlling the ATM switch from the mobile network element.

10. The method according to claim 9, further comprising remotely controlling the ATM switch via a permanent ATM virtual channel between the mobile network element and the ATM switch.

11. The method according to claim 10, wherein a remote control protocol between the network element and the ATM switch is based on one of Simple Network Management Protocol and UNI signalling.

12. A method for mobility management and call control in a mobile network comprising mobile stations, base stations, at least one controlling mobile network element that is responsible for call control and mobility management, and an asynchronous transfer mode (ATM) transmission network comprising at least one ATM switch, the base stations and said controlling mobile network element being connected to the ATM switch by a user-network-interface (UNI), the method comprising:

performing operations related to call control and mobility management in a separate controlling mobile network element, the mobile network element being connected to the ATM switch by a UNI;

transferring signalling related to mobility management and call control transparently between the base stations and the mobile network element through an ATM network on permanent logical virtual channels;

setting up, in the ATM switch, call-specific logical virtual channels between the base stations and other parties by using UNI signalling; and remotely controlling the ATM switch from the mobile network element.

13. An asynchronous transfer mode (ATM) switch element for an ATM network, the ATM switch element being connectable by a user-network-interface (UNI) to base stations and to at least one controlling mobile network element responsible for call control and mobility management, the ATM switch comprising remote control via a mobile network element able to control the ATM switch to switch ATM virtual channels dynamically between the base stations and another point in the ATM network.

14. The ATM switch element according to claim 13, wherein remote control is implemented via a permanent ATM virtual channel between the mobile network element and the ATM switch.

15. The ATM switch element according to claim 13 wherein a remote control protocol between the mobile network element and the ATM switch is a Simple Network Management Protocol.

16. The ATM switch element according to claim 13, wherein remote control between the mobile network element and the ATM switch is based on UNI signalling.

17. The ATM switch element according to claim 13, wherein the ATM switch is able to switch a call directly to another party without having to switch the call via the mobile network element.

18. An asynchronous transfer mode ATM switch element for an ATM network, the ATM switch element being connectable by a user-network-interface (UNI) to base stations and to at least one controlling mobile network element responsible for call control and mobility management, and wherein the ATM switch is privided with remote control via a mobile network element able to control the ATM switch to switch ATM virtual channels dynamically between the base stations and another point in the ATM network, the ATM switch comprises means for performing a standard UNI signalling procedure between the ATM switch, the base station and another point in the ATM network in response to a remote control of the mobile network element, the procedure performing one of setting up, releasing and reswitching a logical virtual channel for a call.

19. A mobile network element connectable to base stations by a user-network-interface (UNI) via an ATM network, wherein the mobile network element comprising being responsible for call control and mobility management in the network and being configured to perform call control and mobility management signalling with each base station transparently through an ATM transmission network via permanent ATM virtual channels between the mobile network element and the base stations; and the mobile network element being configured to remotely control an ATM switch in one of a wireless ATM network and an ATM transmission network to switch ATM virtual channels dynamically between the base stations and another point in at least one network.

20. The ATM switch element according to claim 19, further comprising remote control implemented via a permanent ATM virtual channel between the mobile network element and the ATM switch element.

21. The mobile network element according to claim 19, wherein a remote control protocol between the mobile network element and the ATM switch element is a Simple Network Management Protocol.

22. The mobile network element according to claim 19, wherein remote control between the mobile network element and the ATM switch element is based on UNI signalling.

23. The mobile network element according to claim 19, further comprising the mobile network element being one of a mobile telephone exchange and a base station controller.

* * * * *